Patented Jan. 8, 1952

2,581,921

UNITED STATES PATENT OFFICE 2,581,921

PROCESS OF PRODUCING N-MONO-SUBSTITUTED SULFENAMIDES

Glen Alliger, Akron, Ohio, assignor to The Firestone Tire & Rubber Company, Akron, Ohio, a corporation of Ohio No Drawing. Application December 14, 1949, Serial No. 133,015

4 Claims. (Cl. 260—306.6)

This invention relates to the production of N-mono-substituted sulfenamides. More particularly, it relates to the production of sulfenamides in large particles which are more easily filtered than the smaller sized particles produced heretofore.

In my prior application Serial No. 695,545 filed September 7, 1946 which has now matured into Patent No. 2,495,085 there is described the production of (1) N-isopropyl benzothiazyl sulfenamide from N-mono-chloro-isopropylamine and sodium - 2 - mercaptobenzothiazole, (2) N-cyclohexyl-2-mercaptobenzothiazyl sulfenamide from N-mono-chloro-cyclohexylamine and 2-mercaptobenzothiazole, and (3) N-cyclohexyl-N',N'-diethylthiocarbamyl sulfenamide from N-chlorocyclohexylamine and sodium diethyl-dithiocarbamate. The reaction is carried out at a low temperature for example, a temperature below about 10° C., and for commercial operations within the range of about 10° C. to about —20° or —30° C. Also, the solution concentrations are kept so high that a minimal amount of the N-mono-chloro primary amine is in solution. For that purpose there may be used a 1.5 to 3.5 molar concentration of mercaptide and a 1.5 to 3.0 molar concentration of hypochlorite, which on mixing yield a solution which is at least 0.75 molar with respect to each of the reactants or reaction products. The sulfenamides are obtained in fine particle size according to the procedures there described.

According to this invention, sulfenamides produced by that process or other processes involve the reaction of a mercaptide, an amine and an oxidizing agent. Oxidizing agents which may be used are well known in the art and include chlorine, bromine, iodine, hypochlorous acid, hypobromous acid, hypoiodous acid, the alkali metal and alkaline earth metal salts of those acids, hydrogen peroxide, sodium persulfate, potassium dichromate, potassium ferricyanide, etc.

According to this invention the reaction product is recovered in the form of more easily filterable aggregates by filtering from a two-phase liquid medium, in one phase of which is an organic solvent for the product. The solvent must be inert with respect to the reactants, namely the amine, the oxidizing agent and the mercaptide, and also with respect to the product of the reaction. The solvent is relatively but not completely insoluble in water and is used in such an amount that there is present during the formation or filtration of the product a second liquid phase, although the amount of solvent employed is not sufficient to dissolve an appreciable amount of the product. The organic solvent used must be at least one part soluble in 100 parts of water at the reaction temperature and must dissolve the reaction product to the extent of five to thirty parts per 100 parts of solvent at the reaction temperature. Organic solvents such as diethyl ether, methylethyl ketone, n-butyl alcohol, isobutyl alcohol, sec-butyl alcohol, benzyl alcohol, ethyl acetate, etc. may be used. Petroleum ether is not sufficiently soluble in water. Methyl alcohol and ethyl alcohol, being completely miscible in water, are not satisfactory. The solvent is preferably added to the reaction mixture before precipitation of the sulfenamide, but may be added to the slurry of the freshly precipitated sulfenamide in water, with agitation to form agglomerates which are easily filterable.

The process of my aforesaid patent involves, as a first step, the production of a N-mono-chloro primary amine from a primary amine, of which a number are mentioned in the patent. The process of this invention is not limited to such a two-step operation, and other amines than primary amines may be used, all as is evident from the prior art. The primary amines which may be used include methylamine, ethylamine, the propylamines, the butylamines, cyclohexylamine, benzylamine, allylamine, ethylenediamine, hexahydrobenzylamine, furfurylamine, thenylamine, etc. There are various U. S. patents that suggest the use of secondary amines including the usual aliphatic amines such as dimethylamine, diethylamine, dicyclohexylamine, dibenzylamine, etc., and cyclic compounds such as piperidine, morpholine, etc. All such non-aromatic amines may be employed.

Alkali metal and alkaline earth metal mercaptides which may be used in the process include, for example, those produced from the following mercaptans: thiophenol, thio-beta-naphthol, 2-mercaptothiazoline, 2-mercapto 4,5-dihydroglyoxaline, 2-mercaptobenzoxazole, 2-mercapto 4,5-dimethylthiazole, 2-mercapto-4-ethylthiazole, 2-mercaptobenzothiazole, 2-mercaptomethylbenzothiazole, 2 - mercaptochlorobenzothiazole, and N,N-diethyldithiocarbamic acid. The sodium, potassium, calcium, etc. mercaptides may be employed.

To illustrate the invention, examples are given which involve the process of my prior patent, but these are only illustrative, and in no sense is the invention limited thereto. In adapting this invention to that process the organic solvent is preferably added to the aqueous phase of the N-mono-chloro primary amine, and the examples illustrate the effect of diethyl ether on the particle size of N-isopropyl-2-benzothiazyl sulfenamide under varying conditions tabulated below:

ter, although this property could only be evaluated qualitatively as poor, fair, or excellent in the above record of the results obtained.

The solvent need not be added before precipitation but may be added to the slurry of the precipitate. For example, by adding about 10 per cent by volume of diethyl ether, n-butyl alcohol, ethyl acetate, etc. to the reaction mixture consisting of a slurry of N-isopropyl benzothiazyl sulfenamide suspended in an aqueous mixture of an amine, caustic soda and sodium chloride, and slowly agitating the mixture, the particle size of the N-isopropyl benzothiazyl sulfenamide was increased so that it readily fil-

TABLE

*Effect of ether on particle size of N-isopropyl-2-benzothiazyl sulfenamide*

| Run No. | 1 | 2 | 3 | 4 | 5 | 6 | 7 |
|---|---|---|---|---|---|---|---|
| Addition Time: | | | | | | | |
| NaOCl Solution | ¾ hr | ¾ hr | ¾ hr | ¾ hr | ¾ hr | 1 hr | ¾ hr. |
| Mercaptide Solution | ½ hr | 1 hr | 1 hr | 1 hr | ¾ hr | 1¼ hr | ¾ hr. |
| Conc. (Molar): | | | | | | | |
| NaOCl | 2.77 | 2.77 | 2.77 | 2.77 | 2.77 | 2.77 | 2.77. |
| Mercaptide | (34%) | (34%) | 3.0 | 3.0 | 3.0 | 3.0 | 3.0. |
| Temp. of Reaction, °C. | 5–10 | 5–10 | 0–5 | 0–5 | 0–5 | 0–5 | 0–5. |
| Per cent Yield | 60 | 63 | 88 | 87 | 84 | 88 | 84. |
| Ether per half mole | | | 40 | 40 | 60 | 80 | 20. |
| Ether per cent by volume | | | 10.6 | 10.6 | 15.9 | 21.2 | 5.3. |
| Filterability | Poor | Poor | Excellent | Excellent | Excellent | Excellent | Fair. |
| Relative Particle Size | Fine | Fine | Coarse | Coarse | Coarse | Coarse | Medium Coarse. |

In carrying out each of the seven reactions, 1.25 moles of isopropylamine, 1.15 moles of sodium hypochlorite and 1.00 mole of sodium salt of mercaptobenzothiazole (obtained from commercial mercaptobenzothiazole analyzing 94 per cent pure) were used. In Runs 1 and 2 no ether was used. In Run 3 the reaction mixture, on completion of the reaction, was stirred overnight while coming to room temperature. In Run 4 the reaction mixture was filtered immediately after completion of the reaction. It will be observed that in both cases a good yield was obtained and the particles were sufficiently large to be readily filtered. The yields were calculated on the mercaptobenzothiazole employed. A slight excess of primary amine (10 to 20 per cent, for example) was used to prevent the formation of N-dichloroamine.

The filterability rating was based on a microscopic examination of the wet product. In each run the reaction mixture was diluted to 1.5 liters after addition of the sodium mercaptide to bring the ether into solution in the aqueous phase. The mixture was then filtered and washed three or four times by reslurrying in 1.5 liters of distilled water and filtering. Washing was continued until the filtrate was neutral to litmus and gave no test for chloride ion. After sucking the solid as dry as possible on a Buchner funnel, it was dried in layers one-quarter inch in depth in an oven at 45° C. Photomicrographs of the dried material show the presence of more large agglomerates when ether was used. However, rated on the basis of visual microscopic examination of the wet product, the presence of larger distinct agglomerates was more evident. The wet product was seen as distinct particles, not crystalline in nature but resembling popcorn balls. These agglomerates were evidently broken up to some extent during the drying process. The filterability of the products obtained with the use of ether was clearly bettered and a clear filtrate was obtained.

It is not necessary to first prepare a chloroamine and then react that with a mercaptide; the reactants may be added in any order shown in the prior art. The improvement has nothing to do with the chemical reaction, but with the recovery of the sulfenamide which is formed. If the solvent is added before completion of the chemical reaction as in the foregoing examples, it has no patentable effect on the course of the reaction.

What I claim is:

1. In the process of producing a sulfenamide from a mercaptide, a non-aromatic amine and an oxidizing agent in aqueous solution, the improvement which consists in filtering the reaction product from an aqueous reaction mixture in the presence of a second liquid phase which contains an organic solvent which is not completely miscible with water, is inert with respect to the reactants and the product of the reaction, is soluble in water to the extent of at least one part of solvent in 100 parts of water at the reaction temperature, and dissolves five to thirty parts of the sulfenamide in one hundred parts of solvent at the reaction temperature, the solvent being present in such small amount that it does not dissolve any substantial amount of the sulfenamide.

2. In the process of producing a sulfenamide from a mercaptide, a non-aromatic amine and an oxidizing agent in aqueous solution, the improvement which consists in completing the reaction in aqueous solution in the presence of a second liquid phase which contains an organic solvent which is not completely miscible with water, is inert with respect to the reactants and the product of the reaction, is soluble in water to the extent of at least one part of solvent in 100 parts of water at the reaction temperature, and dissolves five to thirty parts of the sulfenamide in one hundred parts of solvent at the reaction temperature, the solvent being present in such small amount that it does not dissolve any substantial amount of the sulfenamide, and filtering off the reaction product.

3. In the process of producing a sulfenamide from a mercaptide, a non-aromatic amine and an oxidizing agent in aqueous solution, the improvement which consists in filtering the reaction product from an aqueous reaction mixture in the presence of ether, the amount of ether being insufficient to dissolve any substantial amount of the sulfenamide.

4. In the process of producing a sulfenamide from a mercaptide, a non-aromatic amine and an oxidizing agent in aqueous solution, the improvement which consists in completing the reaction in aqueous solution in the presence of ether, the amount of ether being insufficient to dissolve any substantial amount of the sulfenamide, and filtering off the reaction product from the ether-containing mixture.

GLEN ALLIGER.

REFERENCES CITED

The following references are of record in the file of this patent:

UNITED STATES PATENTS

| Number | Name | Date |
|---|---|---|
| 2,495,085 | Alliger | Jan. 17, 1950 |